US011325825B2

(12) United States Patent
Ortowski et al.

(10) Patent No.: US 11,325,825 B2
(45) Date of Patent: May 10, 2022

(54) VALVE FOR A GRAVITY-FEED SILO TANK FUELING SYSTEM

(71) Applicant: ORTEQ ENERGY TECHNOLOGIES, LLC, Gainesville, TX (US)

(72) Inventors: Cody Joe Ortowski, Fort Worth, TX (US); Christopher Cole Ortowski, Fort Worth, TX (US); Jarrett Thomas Wilson, Fort Worth, TX (US); David Lee Arnoldy, Sanger, TX (US); John Edward Saville, Denton, TX (US)

(73) Assignee: ORTEQ ENERGY TECHNOLOGIES, LLC, Gainesville, TX (US)

( * ) Notice: Subject to any disclaimer, the term of this patent is extended or adjusted under 35 U.S.C. 154(b) by 0 days.

(21) Appl. No.: 17/478,941

(22) Filed: Oct. 7, 2021

(65) Prior Publication Data

US 2022/0041427 A1 Feb. 10, 2022

Related U.S. Application Data

(63) Continuation of application No. 17/263,083, filed as application No. PCT/US2019/065044 on Dec. 6, 2019, now Pat. No. 11,148,933.

(60) Provisional application No. 62/776,447, filed on Dec. 6, 2018.

(51) Int. Cl.
| | |
|---|---|
| *B67D 7/46* | (2010.01) |
| *B67D 7/78* | (2010.01) |
| *B65D 88/54* | (2006.01) |
| *B67D 7/56* | (2010.01) |
| *B67D 7/62* | (2010.01) |
| *B67D 7/84* | (2010.01) |

(52) U.S. Cl.
CPC .............. *B67D 7/78* (2013.01); *B65D 88/54* (2013.01); *B67D 7/46* (2013.01); *B67D 7/56* (2013.01); *B67D 7/62* (2013.01); *B67D 7/845* (2013.01)

(58) Field of Classification Search
CPC ... B67D 7/78; B67D 7/62; B67D 7/56; B67D 7/46; B67D 7/845; B65D 88/54
See application file for complete search history.

(56) References Cited

U.S. PATENT DOCUMENTS

| | | | | |
|---|---|---|---|---|
| 5,472,012 A | * | 12/1995 | Wood ..................... | B65D 90/26 137/416 |
| 6,408,869 B1 | * | 6/2002 | Bartos ..................... | F16K 1/303 137/414 |
| 8,631,818 B2 | * | 1/2014 | Mitrovich .............. | B60K 15/04 137/446 |

* cited by examiner

*Primary Examiner* — Jason K Niesz
(74) *Attorney, Agent, or Firm* — Guy V. Manning

(57) ABSTRACT

A fleet refueling silo tank system gravity feeds fuel through hoses to fleet units without requiring pressurizing pumps. A specialized valve at the fleet unit fuel tank prevents vapor escape and admits fuel at low, gravity-feed pressures. The valve includes a valve body with an upper end and a lower end, the upper end adapted to engage a cap which affixes the valve body to the fuel tank fill mouth. Below the cap, a fuel cut-off plunger and seat selectively interrupt fuel flow through the mouth by responding to a buoyant float extending coaxially beneath the valve body and into the fuel tank. Linkage coupled to the plunger extends through the valve body to the float, and roller bearings within the valve body engage a shaft extending from the float coaxially into the lower end of the valve body.

10 Claims, 13 Drawing Sheets

VALVE FOR A GRAVITY-FEED SILO TANK FUELING SYSTEM

BACKGROUND OF THE INVENTION

1. Field of the Invention

This invention relates generally to oil and gas production, and particularly to hydraulic fracturing (fracking) systems and practices. More particularly, this invention relates to a silo tank system for refueling fracking fleet vehicles, and the fuel distribution system associated therewith.

2. Description of Related Art

Hydraulic fracturing, or fracking, comprises an oil and gas production practice whereby fracking fluid, composed mostly of water and sand, is injected into subterranean strata to fracture said strata and release desirable hydrocarbons. Fracking units (see FIG. 2) comprise truck/trailer combinations bearing high pressure pumps and piping for directing fracking fluid down pre-drilled bore holes into suspected deposits of hydrocarbon minerals. Though trailer mounted for portability, fracking units operate continuously while in situ and must be refueled constantly. A system that provides fuel to such units on a reliable, continuous basis, while operating safely in a hazardous environment, is highly desirable.

Traditional refueling systems comprise fuel storage tanks either truck- or skid-mounted or fixed on a non-portable foundation arrangement (see FIGS. 14, 15). The storage tanks are coupled by hoses to fracking units and other equipment arrayed around a fracking site and needing periodic refueling. To induce fuel to flow through the hoses to tanks on various equipment, traditional systems employ pumps which pressurize the fuel, typically to fifty (50) psi or greater. Such fuel distribution hoses are understandably vulnerable to accidents within an industrial environment such as fracking sites. The hoses can leak or rupture due simply to their internal pressure, causing spills and risking catastrophic accidents. A refueling system which relies only upon gravity feed can mitigate the risks of pressurized hoses, as well as obviate the need for pressuring pumps.

Fuel tanks mounted on fracking units traditionally include capped mouths not unlike those for automobile fuel tanks, and they traditionally are similarly refilled using open-air nozzles similar to those found at commercial gas stations for refueling automobiles. Though vapor-capturing apparatus and methods may be employed, vapors still escape, especially from pressurized hoses, presenting risks from random sparks causing vapors to ignite. A refueling system that includes vapor-proof apparatus and methods would be superior to traditional systems.

A valve which threads onto the mouth of equipment fuel tanks would serve this purpose, but it must operate under varying conditions, including varying fuel pressure, flow rates and sometimes uneven terrain. The mouth of some fracking unit tanks is directly atop the tank, while others are angled outward as much as forty-five (45) degrees from vertical. A need exists for a fuel valve that can integrate with myriad equipment fuel tanks and operates smoothly and reliably under such varying conditions, all the while employing gravity fed instead of pressured hoses.

For a properly functioning, gravity-feed refueling system to impel fuel through hoses to multiple fracking site equipment units, the refueling system needs to provide a reliable head pressure of approximately seven (7) psi at the fuel supply outlet, well below the typical pump-pressurized levels currently in use. Traditional refueling systems without pressurizing pumps cannot do this reliably. Even for silo-style fuel reservoirs, the hydraulic head pressure necessarily drops as the level of fuel in the silo drops, approaching zero psi as the fuel level nears the bottom of the tank. A need exists for a gravity-feed fuel storage tank system that reliably maintains a minimum outlet pressure.

Non-truck- or skid-mounted traditional fracking fuel storage systems, whether vertical or horizontal, typically are not portable, but instead fixed in one location. Relocating a fracking unit served by them usually entails new construction of the fuel storage system at a new location. Fracking units sometimes move frequently and to unexpected locations, and delays can be costly. A need exists for a portable fuel tank storage and dispensing system which can be transported and set up in a minimum amount of time.

SUMMARY OF THE INVENTION

A fleet refueling silo tank system gravity feeds fuel through hoses to fleet units without requiring pressurizing pumps. Specialized valves at the fleet unit fuel tanks prevent vapor escape and admit fuel at low, gravity fed pressures. The cylindrical silo tank includes an upper, gravity feed dispensing chamber and a lower reservoir chamber. A fuel pump doubles as means for moving fuel from the reservoir chamber to the dispensing chamber and for refilling the reservoir from fuel delivery trucks. Onboard telemetry transmits fuel consumption and flow rates wirelessly to a control center where operators monitor safety parameters in real time. Stored data may be analyzed to calculate fleet unit maintenance and service intervals. A tractor trailer hauls the silo tank horizontally on roads and highways and includes a gantry and hydraulic lifts to erect the silo tank into vertical operating position supported by a built-in platform.

BRIEF DESCRIPTION OF THE DRAWINGS

The novel features believed characteristic of the present invention may be set forth in appended claims. The invention itself, as well as a preferred mode of use and further objects and advantages thereof, will best be understood by reference to the following detailed description of an illustrative embodiment when read in conjunction with the accompanying drawings, wherein:

DESCRIPTION OF A PREFERRED EMBODIMENT

Figure 1:
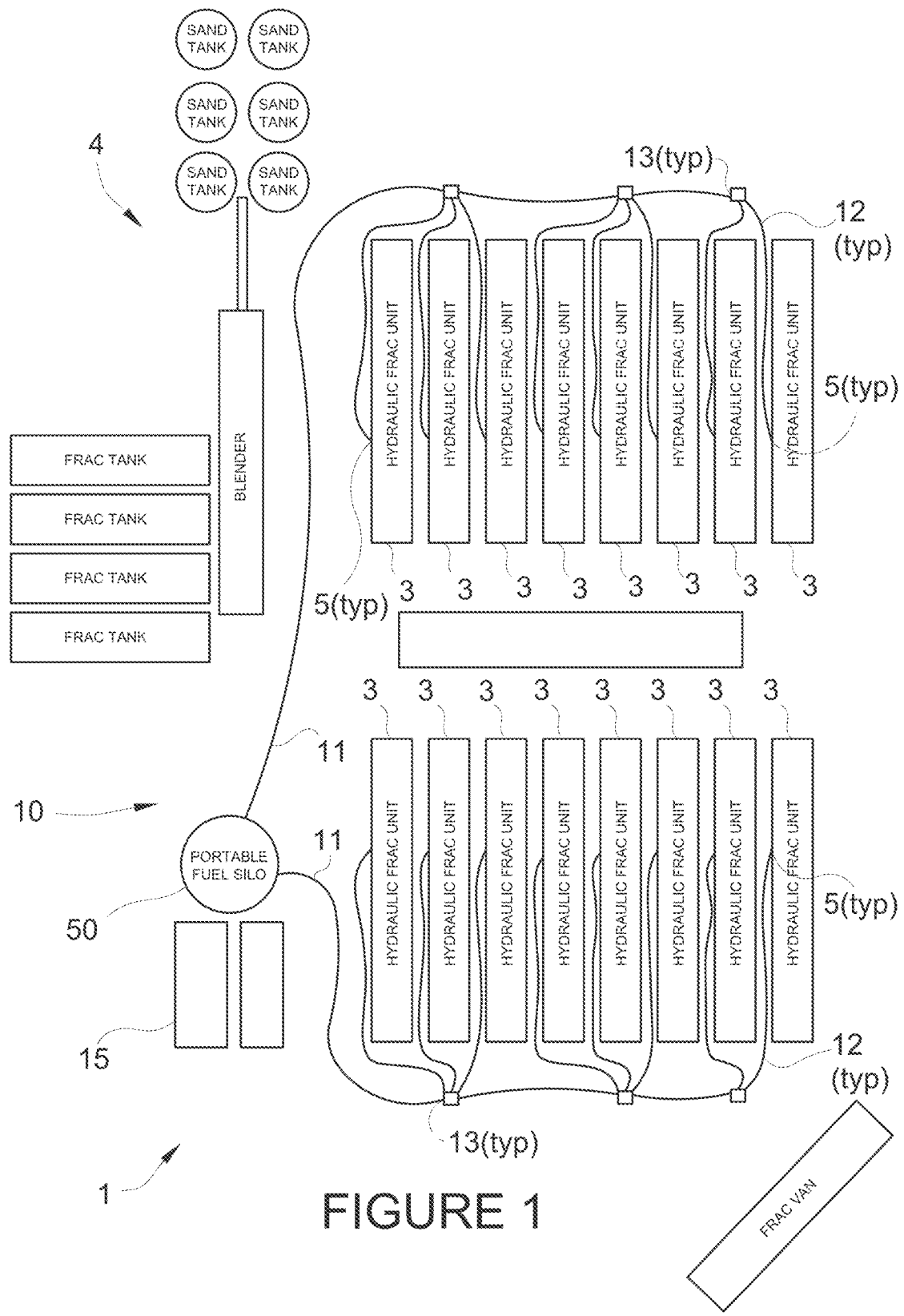
FIG. 1 shows in plan view a typical hydraulic fracking site and installation.
Figure 2:
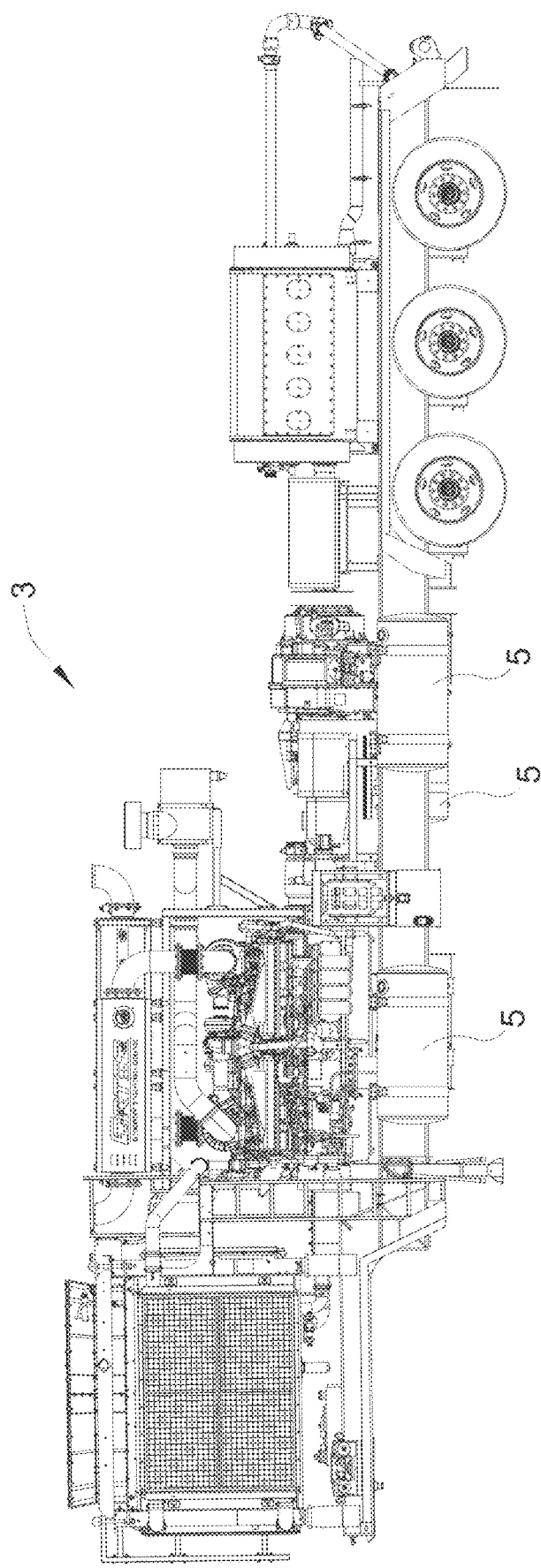
FIG. 2 shows a typical hydraulic fracking unit.

Referring now to the figures, and particularly to FIGS. 1-2, a typical hydraulic fracturing (fracking) site 1 layout includes a plurality of fracking units 3 arrayed together to inject fracking fluid into subterranean strata. Fracking units 3 are juxtaposed largely to take advantage of peripheral systems such as sand/water blending system 4 for creating fracking fluid, and also for advantageous proximity to fueling system 10. Each fracking unit comprises a tractor trailer unit 3 (FIG. 2) bearing the required fracking fluid injection equipment, as well as a control cab and trailer-mounted fuel tank 5.

Stationed near units 3, fuel storage and distribution system 10 includes at least one silo tank 50 coupled to fracking units 3 through fuel distribution apparatus 11, 12, 13. Though not shown in the figures, silo tank 50 also could be coupled to other equipment, such as sand/water blending system 4, or other equipment, including vehicles, which might need refueling. Control van 15 houses monitoring and telemetry equipment to monitor fueling system 10 operations as well as to capture and log fuel flow rates, pressures and the like in real time, enabling a operator (not shown) to react to unexpected circumstances.

Fuel Distribution System

Turning now also to FIGS. 3-7, refueling system 10 of the present invention comprises silo tank 50 shown with trunk lines 11 which extend to distribute fuel to fracking units 3. Though system 10 is depicted in the figures and discussed below in the context of a single silo tank 50, one having ordinary skill in the art will recognize that multiple silo tanks 50 could be ganged together at a given site 1 to increase capacity, depending upon the number and fuel requirements of units 3.

Disposed among fracking units 3, manifolds 13 branch trunk lines 11 into individual tap lines 12 which extend to each of the fracking unit fuel tanks 5 so that all fracking units 3 may be fed simultaneously. Manifolds 13 preferably include throttle controls 14 which permit adjustment of flow rates through trunk lines 11, enabling an operator (not shown) to fine-tune fuel pressure to each unit tank 5. Manifolds 13 may be mounted conveniently, such as on stand 13A.

Figure 3:
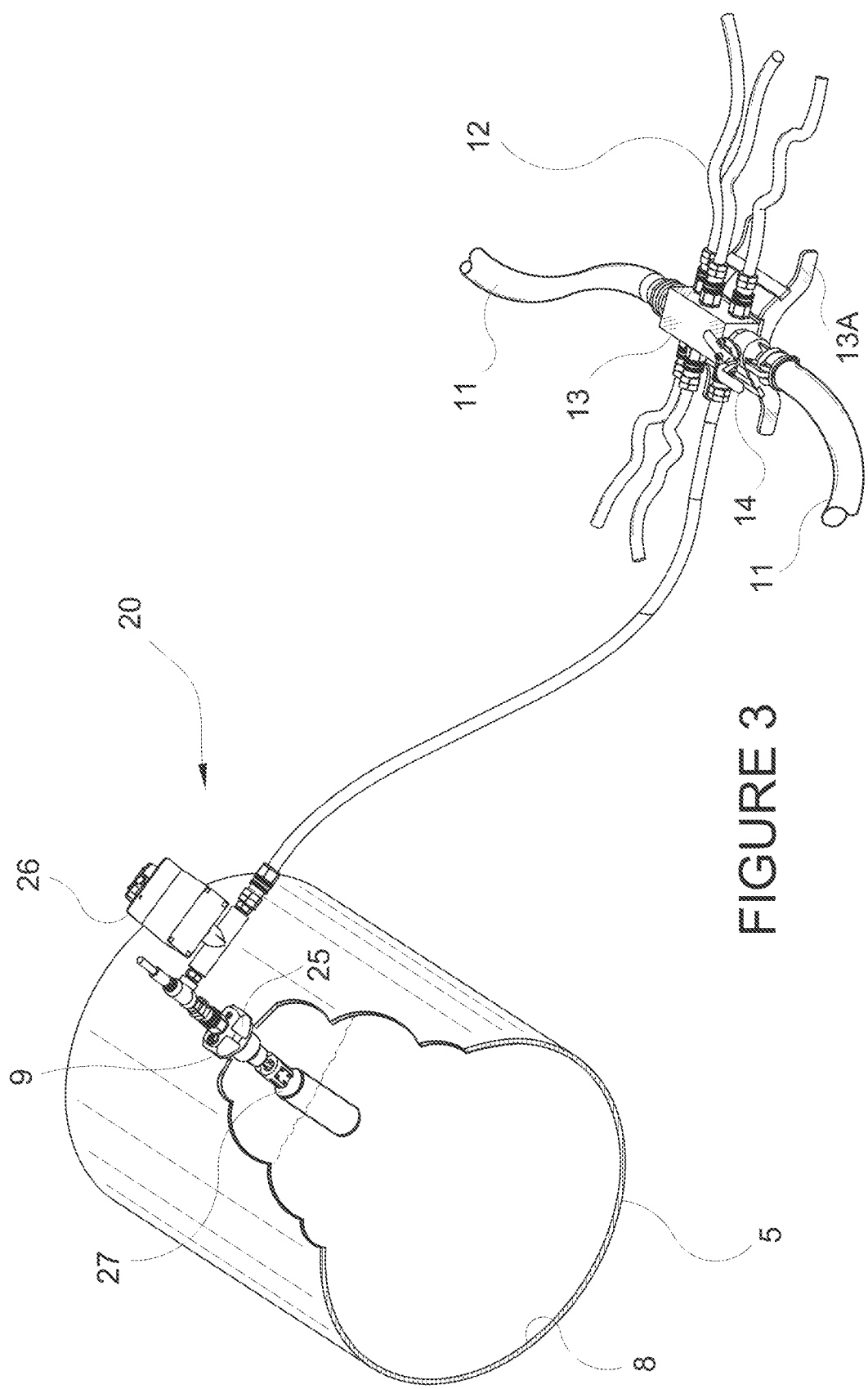
FIGS. 3 and 4 detail the fuel distribution system shown in FIG. 1.
Figure 4:
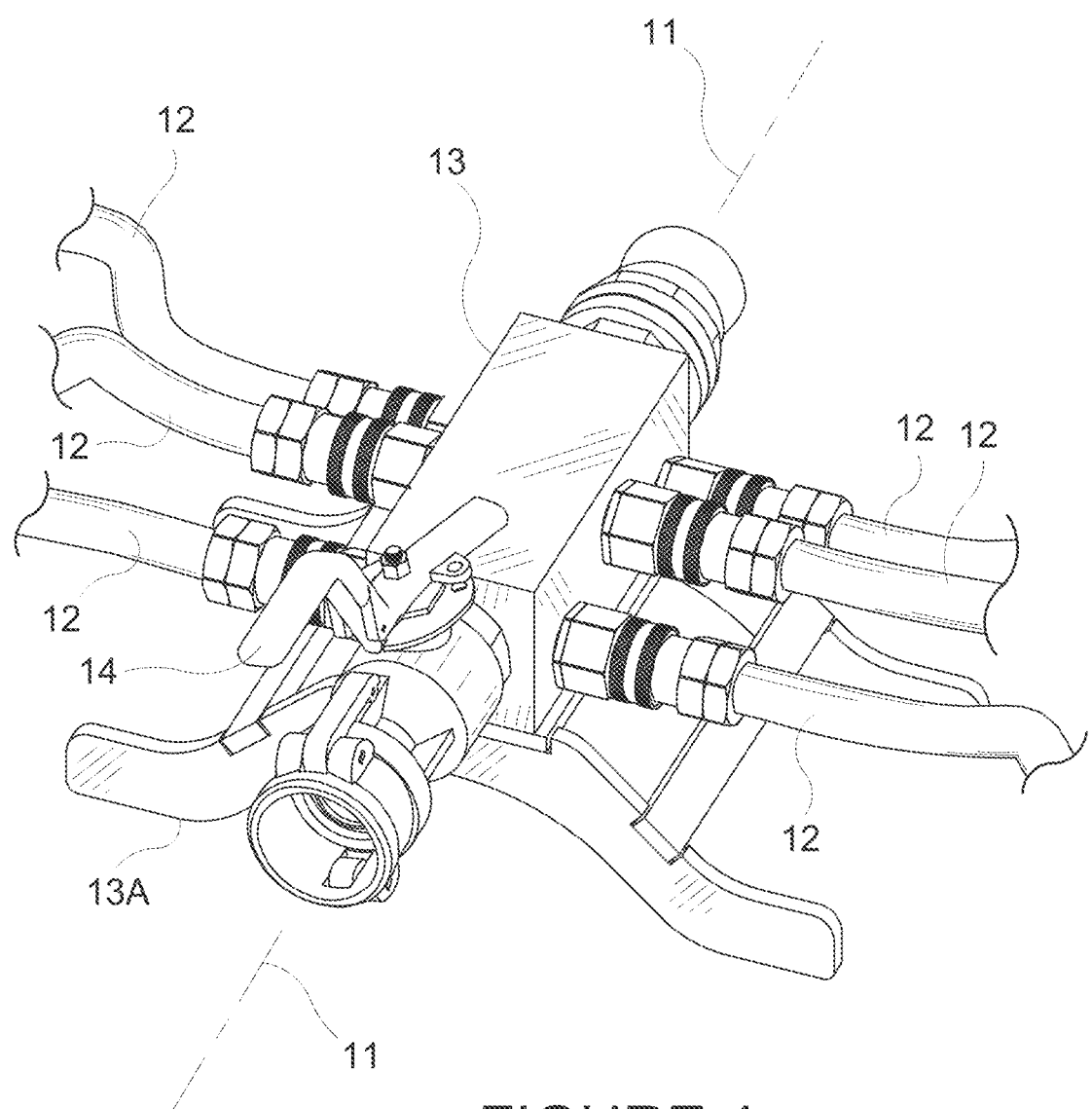

As best seen in FIG. 3, each fuel tank interface 20 terminates each tap line 12 at one fracking unit tank 5. Interface 20 includes a nipple coupled to threaded cap 25 adapted to mate with and seal tank 5's mouth 9 to prevent vapor escaping. Meter 26 measures fuel flow into tank 5 and includes wireless telemetry capable of connecting with receivers in control van 15 for real time monitoring of fuel flow and consumption by fracking unit 3. A pressure relief valve (not shown) may limit pressure buildup within tank 5.

Figure 12:
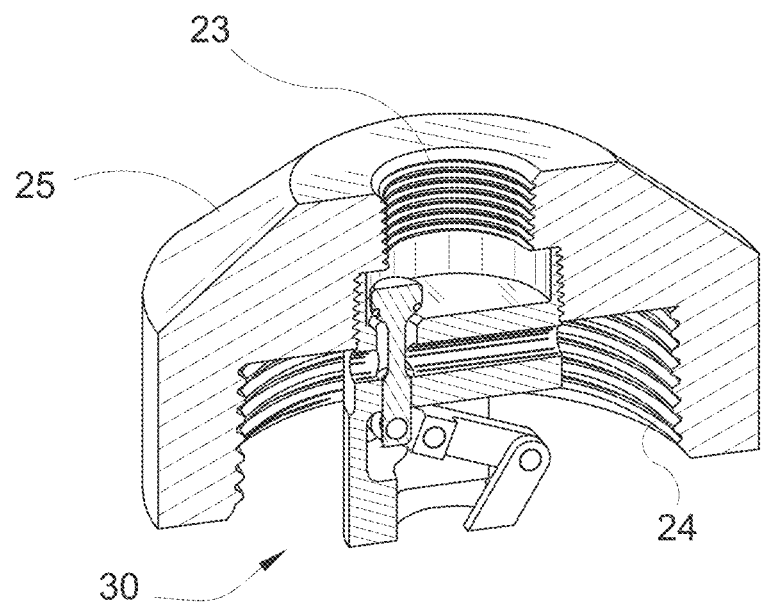
Figure 13:
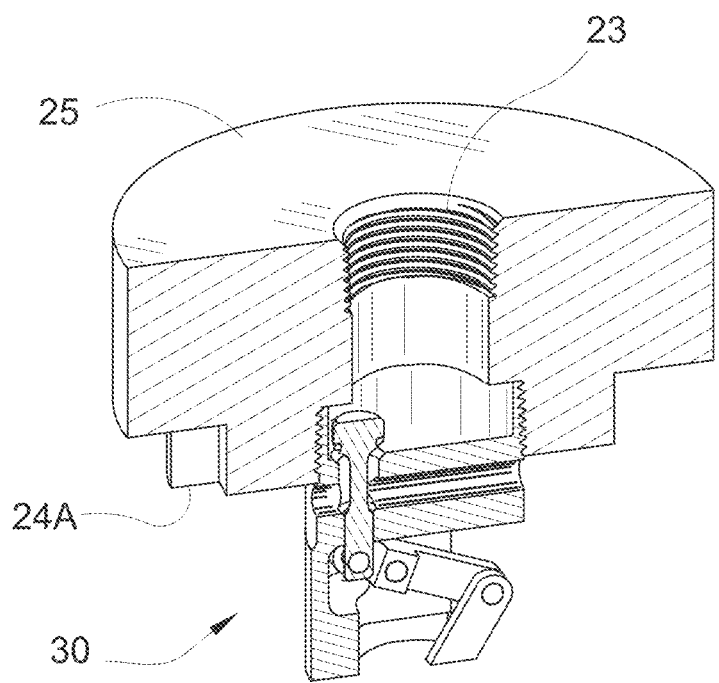
Figure 14:
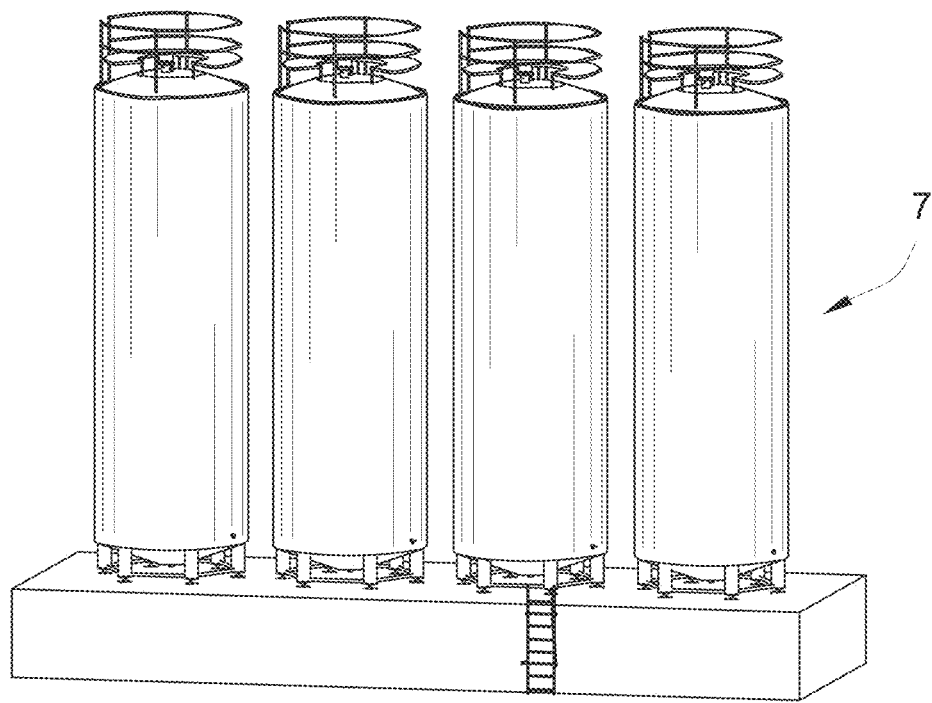
FIGS. 14 and 15 show prior art fuel storage units.
Figure 15:
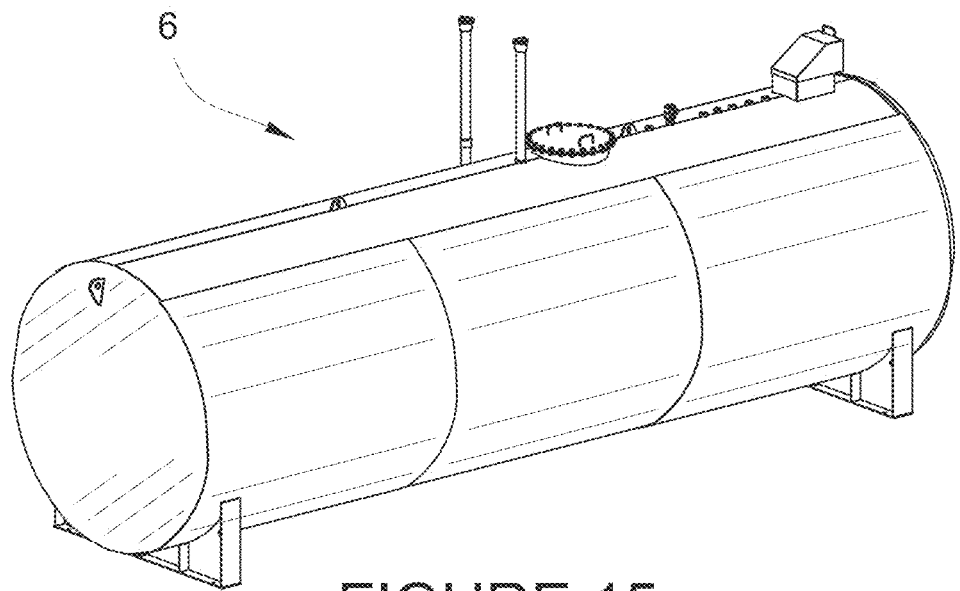
Figure 16:
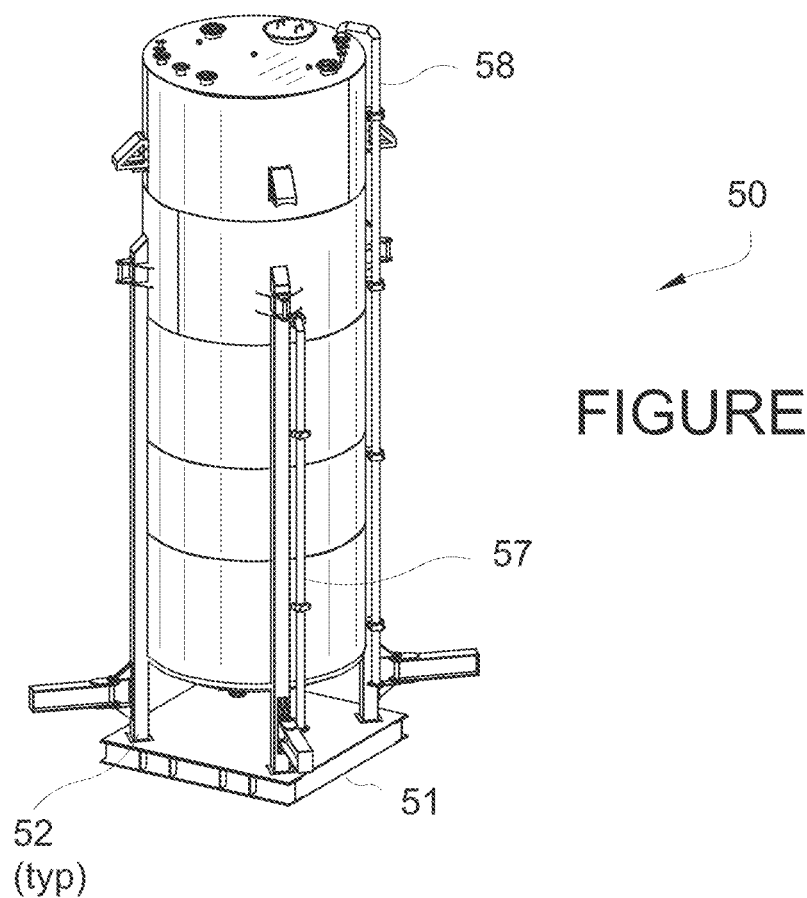
FIGS. 16 and 17 show the dual-chambered fuel silo tank of the present invention.

As mentioned above, the mouths 9 of tank 5 may vary by threaded 24 or bayonet-style 24A (FIGS. 12, 13) closure, size and orientation, but typically are disposed on the upper side of tank 5. The present invention includes a plurality of caps 25 (see FIGS. 12 and 13) adapted to interface with tank 5 mouths 9 for various types of fracking unit tanks 5. One having ordinary skill in the art will recognize that there may be other types of caps 25 for other tanks 5 not depicted, and that any interface cap 25 for each such application is considered to be within the spirit and scope of the present invention.

Fuel Tank Valve

Figure 5:
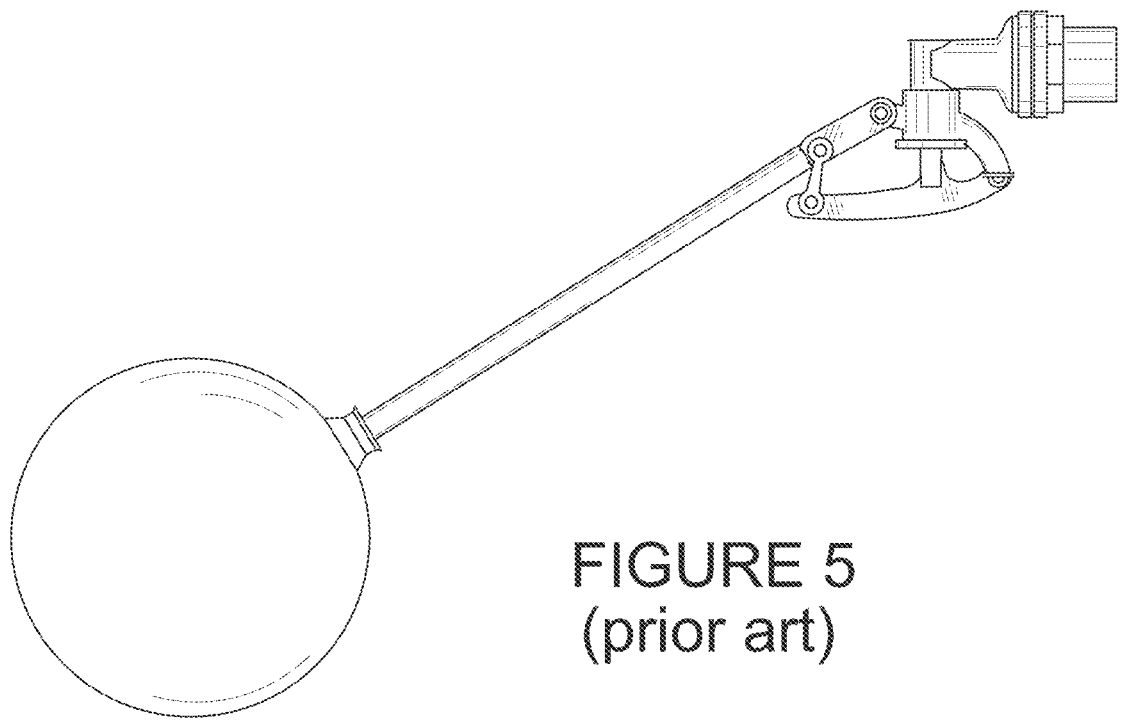
FIGS. 5 and 6 show prior art fracking unit fuel tank control valves.
Figure 6:
Figure 7:
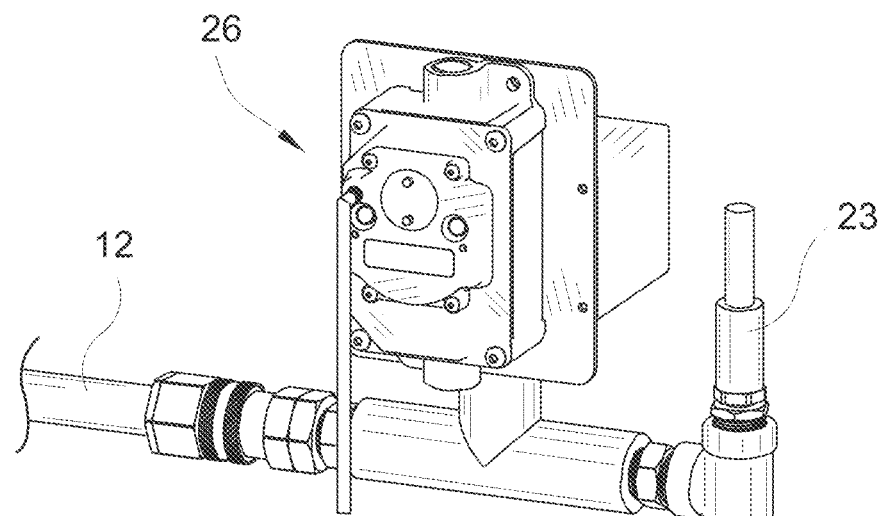
FIGS. 7-13 detail the fracking unit fuel tank control valve of the present invention.
Figure 7:
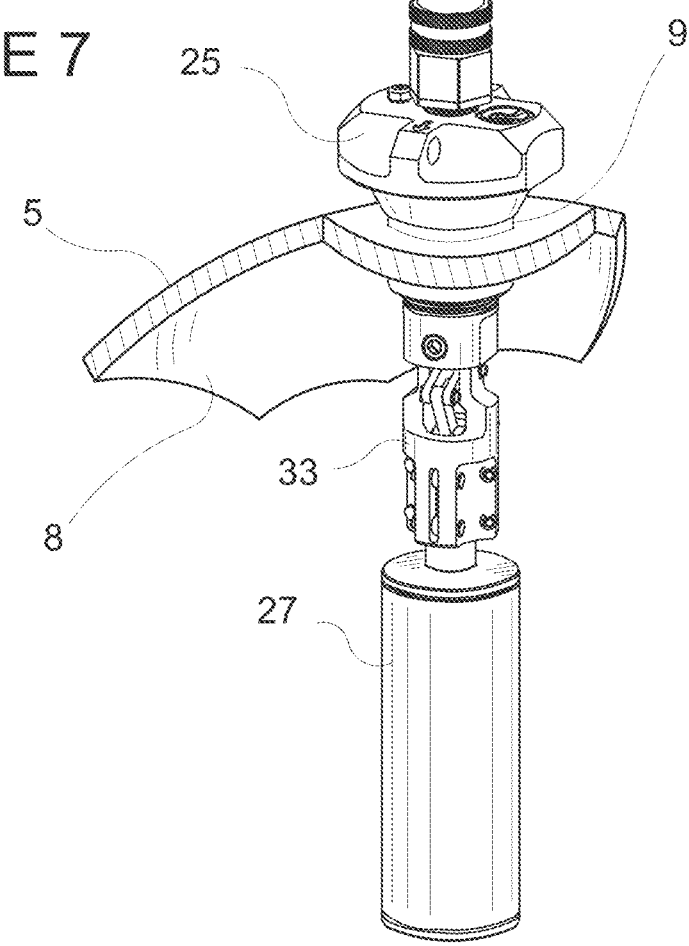
Figure 8:
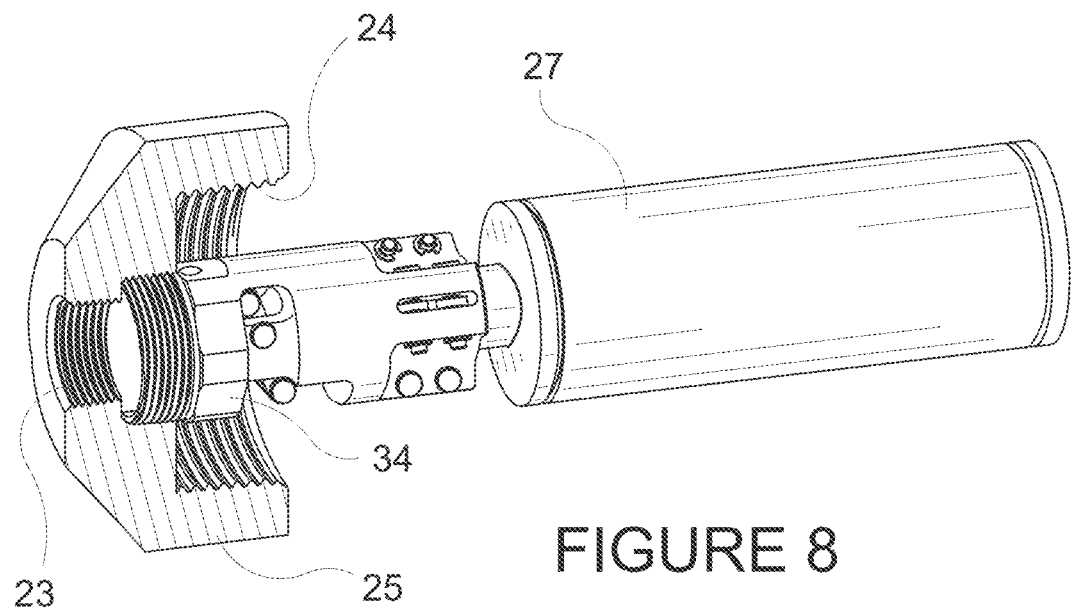
Figure 9:
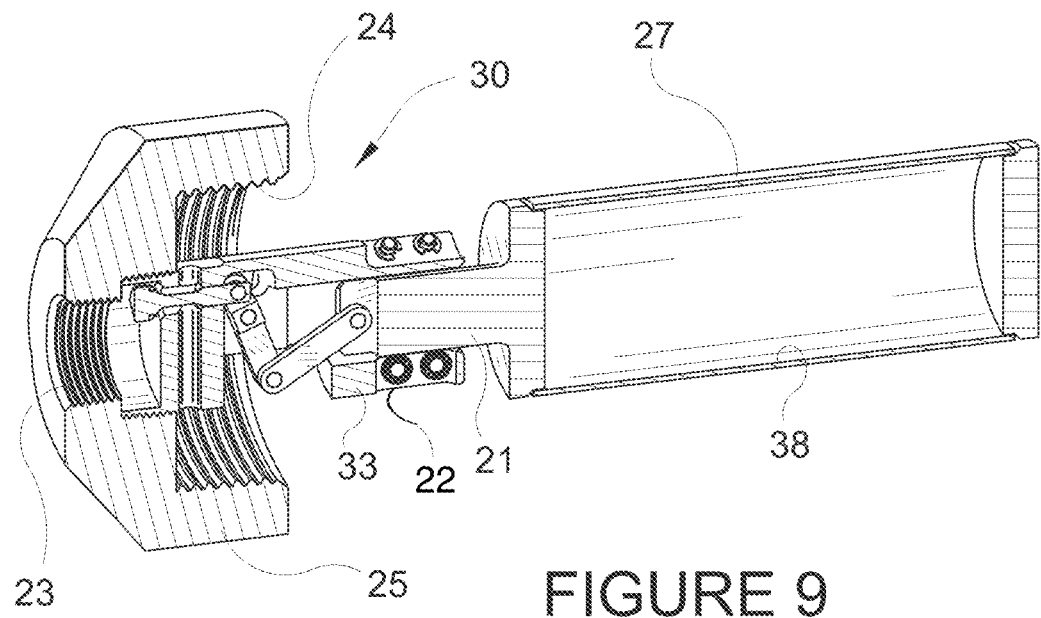

FIGS. 5, 6 show two types of prior art valves available for similar applications, neither of which is satisfactory. The valve shown in FIG. 5 is an industrially available float valve that senses liquid levels, but it requires that mouth 9 of tank 5 be oriented so that the valve remains upright at all times, and the large float could not be deployed through the mouth of tank 5 without modification. The valve shown in FIG. 6 is marketed for fracking unit tank 5 applications but is not suitable for continuous fill nor non-vertical orientations. It also includes internal springs which resist fuel pressure from taps 12 and may prove unsatisfactory for the low, gravity-fed pressure levels anticipated for the present invention.

Fuel valve 30 of the present invention depends from cap 25 through mouth 9 and into the interior of fuel tank 5 so that float 27 engages fuel (not shown) within tank 5. Float 27 couples to cap 25 through neck 21, linkage 34, valve body 33 and orifice plunger 35 to regulate the flow of fuel (not shown) through fill line 36 and into tank 5. Float 27 comprises a hollow cylinder having a diameter capable of passing through the mouth of tank 5, making it easy to install. Preferably, it is fabricated in three pieces from stainless steel bar stock, and welded together to create an air tight interior for buoyancy. One having ordinary skill in the art will recognize that float 27 could be fabricated from other non-reactive materials, such as aluminum or diesel-compatible thermoplastics without departing from the spirit and scope of the present invention.

Figure 10:
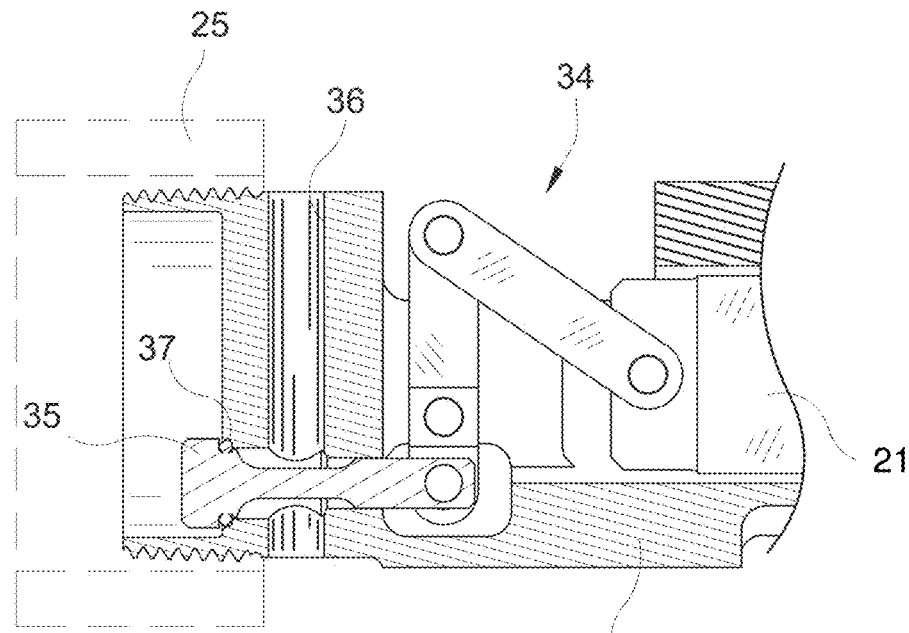
Figure 11:
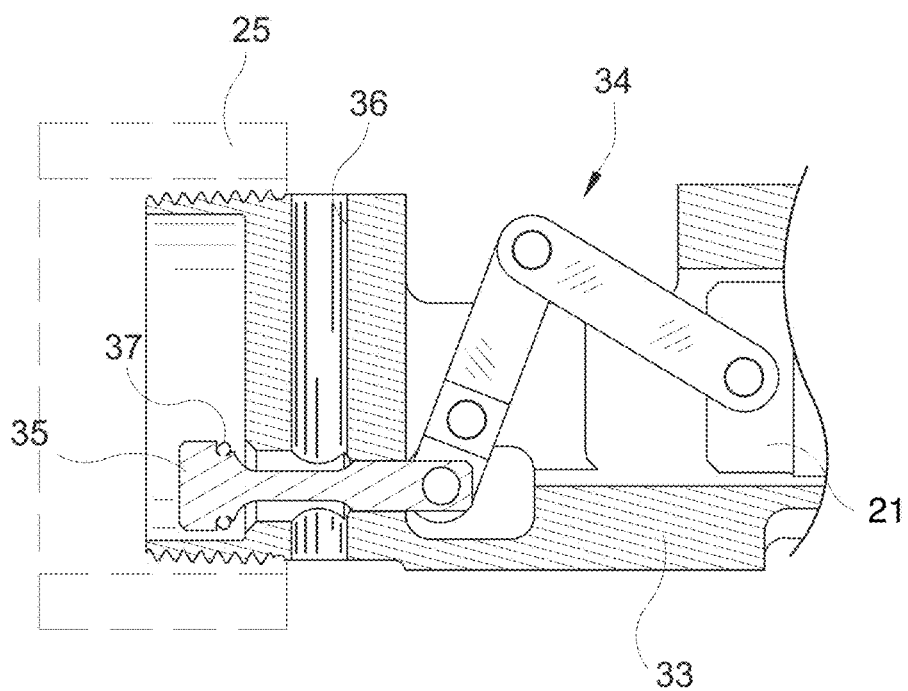

Float 27 couples to valve 30 by neck 21 slidably engaged by roller bearings 22 to maintain smooth, longitudinal movement to flex linkage 34 to open and close plunger 35. With linkage 34 configured as shown in FIGS. 10, 11, connecting between float 27 and plunger 35, valve 30 requires no seat springs nor external pneumatic or mechanical mechanisms to regulate the level of fuel within tank 5. Pressure of fuel against plunger 35 need not be of an amount sufficient to depress a seat spring, as none is present. Valve 30 opens and closes solely in response to the level of fuel in tank 5 as determined by float 27.

Silo Tank

Turning now also to FIGS. 14-17, typical fuel storage tanks 6, 7 comprise a plurality of vertical, silo-type tanks (FIG. 14) and a horizontal, skid-mounted tank 6. As discussed above, horizontal tanks 6 cannot provide the minimum outlet pressure because their head pressures are low, thus requiring pressurizing pumps (not shown) to induce fuel to flow toward fracking units 3 and their tanks 5. Also as discussed above, silo-style tanks 7 similarly fail when their fuel levels drop, also requiring pressurizing pumps to maintain minimum outlet pressure.

Figure 17:
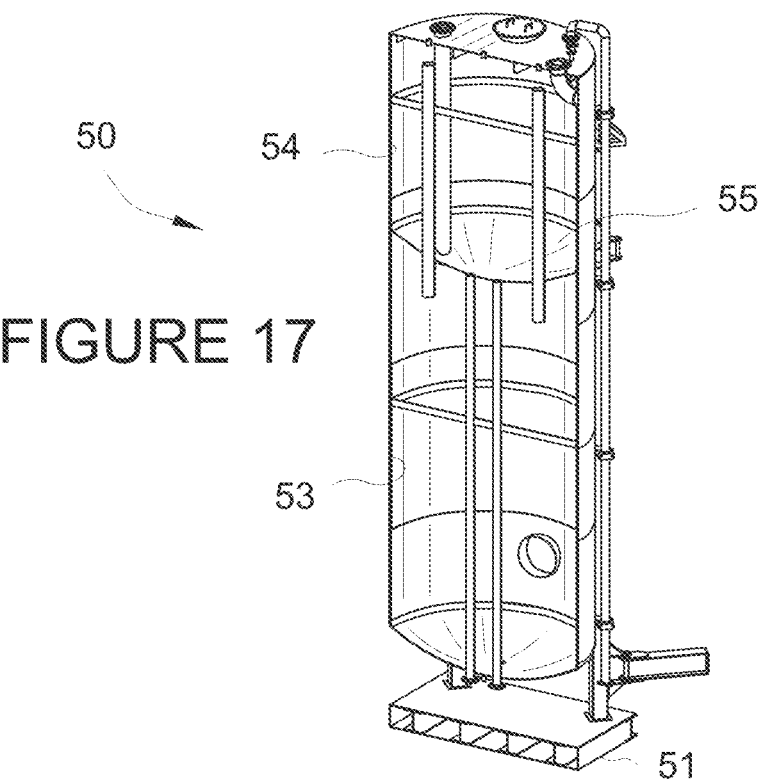
Figure 18A:
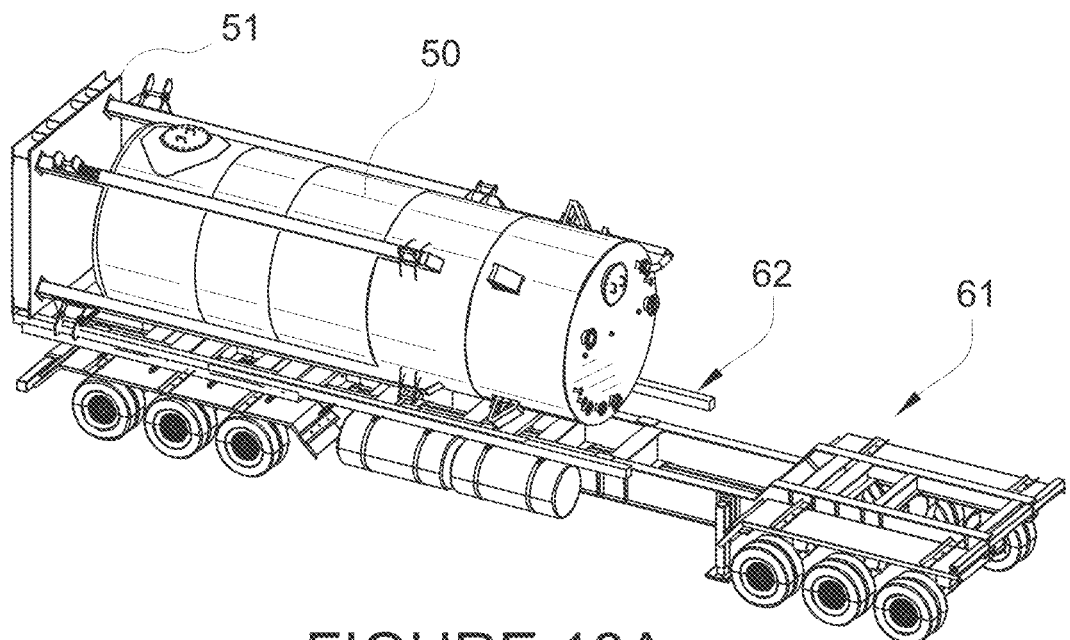
FIGS. 18A-18D show the portability feature of the dual-chambered fuel silo tank of the present invention.
Figure 18B:
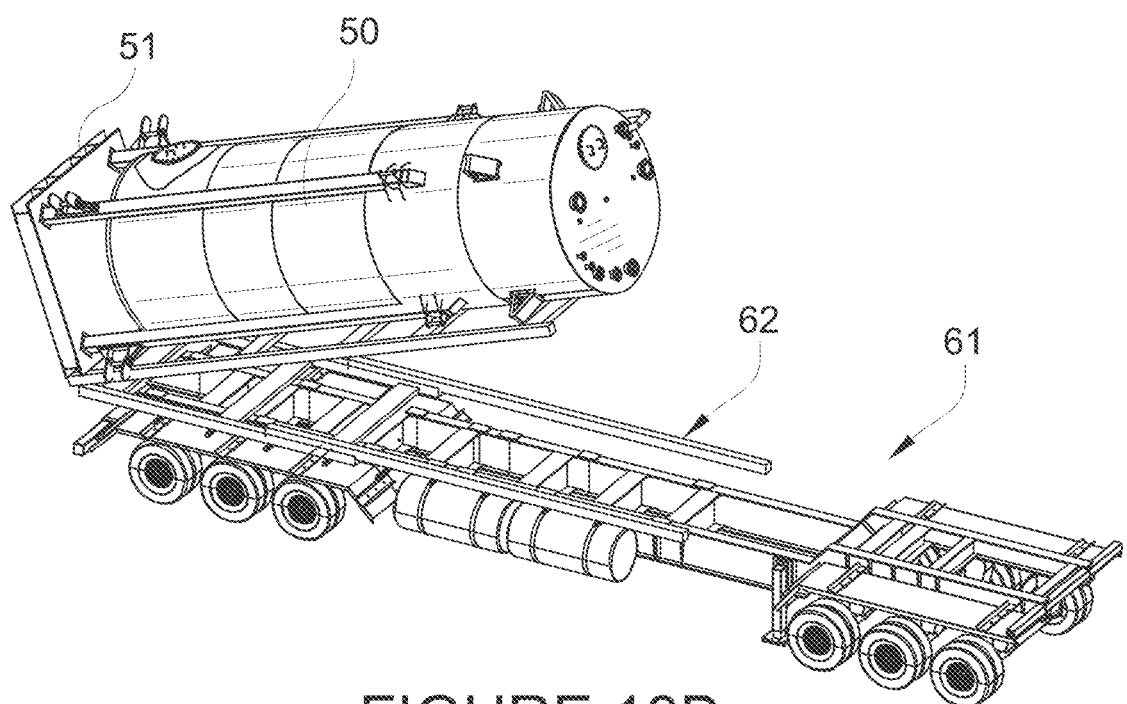
Figure 18C:
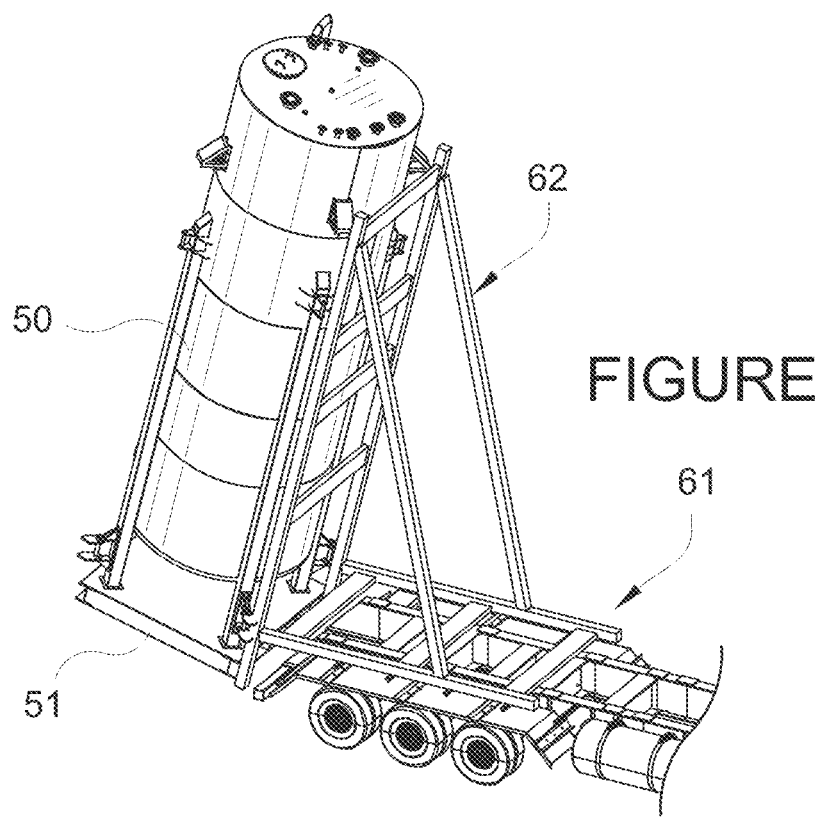
Figure 18D:
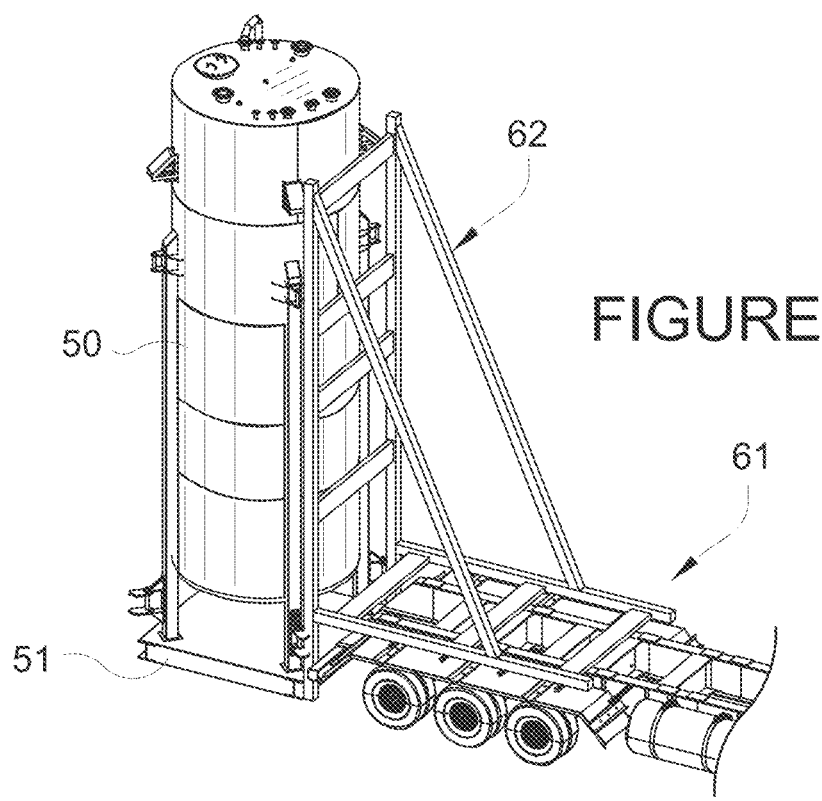

The present invention comprises at least one dual-chambered silo tank 50, each erected upon its own platform 51 and supported vertically by at least three legs 52. As depicted in FIG. 17, silo tank 50 includes upper fuel-dispensing chamber 54 disposed above and coaxial with lower, fuel reservoir chamber 53 within the envelope of silo 50. As depicted, silo tank 50 is approximately ten (10) feet in diameter and stands approximately thirty-five (35) feet tall, and chambers 53, 54 have the same diameter. One having ordinary skill in the art will recognize that silo tank 50 could vary in diameter, height and proportions without departing from the scope of the present invention, its geometry being limited by transportation constraints as discussed below.

Preferably, upper dispensing chamber 54 has a capacity of approximately 5500 gallons of fuel volume, while lower reservoir chamber 53 holds 9000-10,000 gallons of fuel volume, making the total fuel storage capability of silo tank 50 approximately 15,000 gallons, one third of which is elevated approximately twenty-four (24) feet above grade.

Because it is disposed at the top one-third of a substantially 35 foot tall column (silo tank 50), fuel within upper fuel dispensing chamber 53 maintains a head pressure comfortably above the minimum seven (7) psi required to gravity feed fuel through hoses 11, 12 to fracking units 3.

Dispensing conduit 57 couples to bottom 55 of upper fuel dispensing chamber 54 and gravity feeds fuel into trunk hoses 11, as discussed above. Refill conduit 58 couples between both chambers 53, 54 and permits a fuel pump (not shown) to keep upper dispensing chamber 54 filled to near capacity, thereby maintaining the outlet pressure through conduit 57 reliably constant. Periodically, when lower chamber 53 nears empty, a fuel delivery truck (not shown) may be coupled to a fill nozzle (not shown) also coupled to the fuel pump to refill lower reservoir chamber 53 without disrupting flow from upper dispensing chamber 54

Portability

Turning now also to FIGS. 18A-18D, silo tank 50 is shown being installed at site 1. Horizontally disposed on trailer 61 (FIG. 18A), silo tank 50 can be transported on roadways and highways between sites 1. Upon arriving at site 1, silo 50 quickly may be elevated into its vertical operating position (FIGS. 18B-18D in sequence) to rest upon its platform 51. Hydraulic lifts (not shown) on board trailer 61 extend to erect gantry 62 bearing silo tank 50. No separate crane or other equipment is needed at site 1 for the purpose, as the same vehicle 61 which hauls silo tank 50 on the roadways also lifts it into its operating position. Once silo tank 50 is settled into place, gantry 62 is hauled away on trailer 61, and returned comparatively quickly to remove and relocate silo tank 50 as needed.

In operation, a crew (not shown) brings silo tank 50 to site 1 and erects it onto platform 51 at a select location within site 1 near but a safe distance away from fracking units 3. The crew deploys hoses 11 from silo tank 50 toward fracking units 3 and positions manifolds 13 conveniently where each may couple one or more branch hoses 12 to a like number of fracking units 3. Valves 30 are secured to caps 25 selected to fit the mouths of tanks 5 and inserted into tanks 5. Hoses 12 are coupled to caps 25 employing interfaces 20, as discussed above, and meters 26 tested for wireless connectivity to van 15. Silo tank 50 then is filled with fuel by pumping it into lower reservoir chamber 53, then upward through fill pipe 58 to upper dispensing chamber 54. When fracking units 3 are ready to operate, an operator (not shown) opens controls 14 on manifolds 13 to enable gravity feed of fuel into tanks 5 as they are drained by equipment on fracking units 3. When operations cease at site 1, the foregoing steps may be reversed to remove the present invention from site 1 for relocation to another site.

While the invention has been particularly shown and described with reference to preferred and alternate embodiments, it will be understood by those skilled in the art that various changes in form and detail may be made therein without departing from the spirit and scope of the invention. For example, the entire system has been described in the context of refueling hydraulic fracking units, but it could just as easily serve other sites having different purposes and equipment.

We claim:

1. A float valve for continuous refueling of a fuel tank, said fuel tank having a fuel reservoir and a fuel tank mouth, the float valve comprising a cap adapted to mate with said fuel tank mouth, said cap including a cap port removably coupled to a fuel source;

a valve body coupled coaxially to said cap and having
   a longitudinal valve body axis having an upper axis end proximate said cap and a distal lower axis end;
   a fuel inlet chamber in fluid communication with said cap port;
   a fuel outlet chamber having an outlet port in fluid communication with said tank fuel reservoir;
   a valve seat disposed between said fuel inlet chamber and said fuel outlet chamber;
   a plunger having a plunger head affixed to a plunger proximate end disposed within said fuel inlet chamber, said plunger extending through said valve seat to a plunger distal end and adapted to articulate between a closed plunger position with said plunger head received in said valve seat and an opposite open plunger position;

a float disposed coaxial with said valve body distal said cap and within said fuel reservoir and adapted to move axially in response to varying levels of fuel in said fuel reservoir; and linkage coupled between said plunger distal end and said float, said linkage adapted to cause said plunger to articulate between said open plunger position and said closed plunger position in response to axial movement of said float.

2. The refueling system of claim 1 and further comprising a coaxial float neck coupled to said float; and
a plurality of roller bearings disposed within said valve body and adapted to engage said coaxial float neck.

3. The refueling system of claim 1 wherein said float further comprises
a buoyant cylindrical float body disposed coaxial with said valve axis; and
a diameter sized to be admitted through said fuel tank mouth.

4. The refueling system of claim 3 and further comprising a coaxial float neck coupled to said float; and
a plurality of roller bearings disposed within said valve body and adapted to engage said coaxial float neck.

5. The refueling system of claim 1 wherein said linkage further comprises
a plunger linkage bar having
   a plunger linkage bar proximate end pivotally coupled to said plunger second end
   and a plunger linkage distal end;
a float linkage bar having
   a float linkage bar first end pivotally coupled to said plunger linkage bar distal end
   and a float linkage bar second end pivotally coupled to said float.

6. The refueling system of claim 5 and further comprising a plunger linkage bar pivot coupled to said valve body between said plunger linkage bar proximate end and said plunger linkage bar distal end, whereby movement of said float longitudinally toward said cap causes said plunger head to journal within said valve body seat and prevent fluid movement between said fuel intake chamber and said fuel outlet chamber.

7. A float valve system for a gravity-feed refueling system, said refueling system having a fuel silo, at least one trunk hose extending from said fuel silo to at least one fuel tank, each of said at least one fuel tanks having a fuel tank reservoir and a fuel tank mouth, the float valve system comprising a valve interface coupled to each of said at least one fuel tanks between one of said at least one trunk hoses and said fuel tank reservoir, each valve interface having
  a cap adapted to mate with said fuel tank mouth, said cap including a cap port removably coupled to said one of said at least one trunk hoses;
  a valve body having a longitudinal valve axis and coupled coaxially to said cap, said valve body adapted to insert into said fuel tank through said fuel tank mouth, said valve body having
    a fuel inlet chamber in fluid communication with said cap port;
    a fuel outlet chamber in fluid communication with said tank fuel reservoir;
    a valve seat disposed between said fuel inlet chamber and said fuel outlet chamber; and
    a plunger extending through said valve seat and having
      a plunger head end disposed in said fuel inlet chamber;
      a plunger head affixed to said plunger head end; and
      a plunger linkage end opposite said plunger head end;
    said plunger adapted to articulate between a closed plunger position with said plunger head journaled in said valve seat and an open plunger position;
  a float disposed coaxial with said valve body distal said cap, said float having
    a cylindrical float body coaxial with said valve axis; and
    a diameter sized to be admitted through said fuel tank mouth,
    said float adapted to articulate axially in response to a level of fuel within said fuel tank reservoir; and
  linkage pivotally coupled between said float and said plunger.

8. The refueling system of claim 7 and further comprising
  a coaxial float neck coupled to said float; and
  a plurality of roller bearings disposed within said valve body and adapted to engage said coaxial float neck.

9. The refueling system of claim 7 wherein said linkage further comprises
  a plunger linkage bar having
    a plunger linkage bar proximate end pivotally coupled to said plunger linkage end
    and a plunger linkage bar distal end;
  a float linkage bar having
    a float linkage bar first end pivotally coupled to said plunger linkage bar distal end; and
    a float linkage bar second end pivotally coupled to said float.

10. The refueling system of claim 9 and further comprising
  a plunger linkage bar pivot coupled to said valve body between said plunger linkage bar proximate end and said plunger linkage bar distal end,
whereby movement of said float longitudinally toward said cap causes said plunger head to journal within said valve seat and prevent fluid movement between said fuel intake chamber and said fuel outlet chamber.

* * * * *